US009251281B2

(12) United States Patent  (10) Patent No.: US 9,251,281 B2
Choudhary et al.  (45) Date of Patent: Feb. 2, 2016

(54) WEB BROWSING USING PLACEMARKS AND CONTEXTUAL RELATIONSHIPS IN A DATA PROCESSING SYSTEM

(75) Inventors: Samar Choudhary, Morrisville, NC (US); Humberto Gutierrez-Rivas, Chapel Hill, NC (US); Vijay Pandiarajan, Apex, NC (US); Niraj D. Patel, Apex, NC (US); Balan Subramanian, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1191 days.

(21) Appl. No.: 12/181,501

(22) Filed: Jul. 29, 2008

(65) Prior Publication Data

US 2010/0031166 A1  Feb. 4, 2010

(51) Int. Cl.
*G06F 17/00* (2006.01)
*G06F 17/30* (2006.01)

(52) U.S. Cl.
CPC ...... *G06F 17/30884* (2013.01); *G06F 17/3089* (2013.01)

(58) Field of Classification Search
CPC .......... G06F 17/3089; G06F 17/30867; G06F 17/30884
USPC .................................. 715/206, 241
See application file for complete search history.

(56) References Cited

U.S. PATENT DOCUMENTS 5,784,058 A * 7/1998 LaStrange et al. ............ 715/738
5,890,171 A * 3/1999 Blumer et al. ................ 715/229

(Continued)

OTHER PUBLICATIONS

Fujima et al., "Clip, Connect, Clone: Combining Application Elements to Build Custom Interfaces for Information Access," in Proceedings of the 17th annual ACM symposium on User Interface Software and Technology (UIST '04). ACM, New York, NY, USA, pp. 175-184.*

(Continued)

*Primary Examiner* — Laurie Ries
(74) *Attorney, Agent, or Firm* — Cuenot, Forsythe & Kim, LLC (57) ABSTRACT

A system and method for web browsing using placemarks and contextual relationships in a data processing system. A navigation placemark is provided within a web browser. The web browser comprises a first web page and a second web page. A piece of information is located at a specific location within each of the first and second web pages. A first individual placemark is added to the navigation placemark, and a second individual placemark is added to the navigation placemark. Web page content is extracted from the first web page and can be used to control information shown within the second web page. An interaction between the first individual placemark and the second individual placemark is specified. A trigger criteria for the first individual placemark and the second individual placemark is also specified. A first profile and a second profile are created. The first profile is run as a background process that can be driven by the second profile, and a user may switch between the first and second profiles. The web browser may further comprise a first browser window comprising the first web page and a second browser window comprising the second web page, and/or the web browser may further comprise a browser window comprising a first tab and a second tab, where the first tab comprises the first web page and the second tab comprises the second web page.

20 Claims, 3 Drawing Sheets

(56) References Cited

U.S. PATENT DOCUMENTS

| | | | |
|---|---|---|---|
| 5,918,239 A * | 6/1999 | Allen et al. | 715/210 |
| 5,987,480 A * | 11/1999 | Donohue et al. | 715/207 |
| 6,003,046 A * | 12/1999 | Nielsen | 715/206 |
| 6,029,180 A * | 2/2000 | Murata et al. | 715/251 |
| 6,044,360 A * | 3/2000 | Picciallo | 705/21 |
| 6,044,372 A * | 3/2000 | Rothfus et al. | |
| 6,353,447 B1 * | 3/2002 | Truluck et al. | 715/733 |
| 6,535,912 B1 * | 3/2003 | Anupam et al. | 709/217 |
| 6,901,438 B1 * | 5/2005 | Davis et al. | 709/219 |
| 6,976,210 B1 * | 12/2005 | Silva et al. | 715/205 |
| 6,993,707 B2 * | 1/2006 | Baker et al. | 715/241 |
| 7,200,804 B1 * | 4/2007 | Khavari et al. | 715/230 |
| 2003/0023445 A1 * | 1/2003 | Trifon | 704/270.1 |
| 2004/0117349 A1 * | 6/2004 | Moricz | 707/1 |
| 2004/0205514 A1 * | 10/2004 | Sommerer et al. | 715/501.1 |
| 2004/0236774 A1 * | 11/2004 | Baird et al. | 707/100 |
| 2005/0229188 A1 * | 10/2005 | Schneider | 719/328 |
| 2006/0101005 A1 * | 5/2006 | Yang et al. | 707/3 |
| 2006/0143559 A1 * | 6/2006 | Spielberg et al. | 715/512 |
| 2006/0224942 A1 * | 10/2006 | Hidesawa et al. | 715/501.1 |
| 2006/0242161 A1 * | 10/2006 | Ten Kate et al. | 707/100 |
| 2007/0130177 A1 * | 6/2007 | Schneider et al. | 707/100 |
| 2008/0201650 A1 * | 8/2008 | Lemay et al. | 715/763 |
| 2009/0024632 A1 * | 1/2009 | Dheap et al. | 707/10 |
| 2009/0235187 A1 * | 9/2009 | Kim et al. | 715/760 |
| 2009/0249179 A1 * | 10/2009 | Shieh et al. | 715/206 |

OTHER PUBLICATIONS

Jeffrey Wong and Jason I. Hong, "Making mashups with Marmite: towards end-user programming for the web," in Proceedings of the SIGCHI conference on Human factors in computing systems (CHI '07). ACM, New York, NY, USA, pp. 1435-1444 (2007).*

Nino, I.J. et al., "CARENA, a Tool to Capture and Replay Web Navigation Sessions," [online] In IEEE Workshop on End-to-End Monitoring Techniques and Services, pp. 127-141, May 15, 2005 [retrieved Jul. 15, 2014] retrieved from the Internet: <http://www.gii.upv.es/web_architecture/download/paper-20061031125115-apont.pdf>, 15 pg.

Anupam, V. et al., "Automating Web Navigation With the WebVCR," In Computer Networks: The Int'l. Journal of Computer and Telecommunications Networking, Vo. 33, No. 1-6, pp. 53-517, Jun. 2000.

* cited by examiner

WEB BROWSING USING PLACEMARKS AND CONTEXTUAL RELATIONSHIPS IN A DATA PROCESSING SYSTEM

BACKGROUND

1. Technical Field

The present invention relates generally to data processing systems and in particular to methods for web browsing using placemarks and contextual relationships within data processing systems.

2. Description of the Related Art

The Internet contains a vast amount of information that is spread across an equally vast number of web sites. A web user searching for information on the Internet will often begin by utilizing a search engine (e.g., Google®, a registered trademark of Google, Inc.) to perform a search, the search result containing a list of web links (e.g., that link to various web sites) that may or may not be of interest to the user. The user will generally click on some of the links provided by the search in an attempt to glean desired information from at least some of the linked web sites; however, there is a considerable amount of trial and error involved. When the user does happen upon a piece of desired information in one of the linked web sites, there is no way to save the exact location of the web page containing that piece information. The common alternative is to bookmark the web page containing the piece of desired information, leaving the user with only a hope of quickly finding that exact location of the web page again. Because of the considerable effort involved in this trial and error approach, the user may also want to remember the sequence of web sites visited during the search for future reference. Instead, a user is likely to end up with many open web sites (e.g., where each web site is open in a new window or where each web site is open within a different tab of a single web browser window), and the user will have to remember the sequence of his/her navigation through those web sites as well as try to remember where within each of those web pages the desired information is located. A collection of bookmarked web sites can help somewhat, but such a list only provides a gross collection of information that a user will still have to sift through.

As mentioned, a tabbed web browser window (e.g., containing a plurality of tabs) can be used to open a plurality of web sites (or web pages), where one of the plurality of web sites (or web pages) is open within each one of the plurality of tabs of the tabbed browser window. More generally, a tabbed window is a window that allows multiple documents to be contained within a single window, where the tabs are used to navigate between the documents. While tabbed windows are most commonly associated with web browsers, they may also be used in web applications and text editors. Tabbed windows help to reduce on-screen clutter, but they do not present related information within a particular context together. Any contextual grouping of the information contained within the tabs would have to be performed manually by the user, making tab content management a tedious process. It is also not uncommon for a user browsing the Internet to have a browser window open with many tabs. Thus, it would be easy for the user to forget which tab contains what information and how the information in one tab is related to the information in another tab.

Mashups, which provide the ability for users to build their own web applications through the aggregation of content from a plurality of web sites, can be used to provide some contextual grouping of information within a web page. However, the interactions between the aggregated content needs to be supported by a server, and often by the providers of each of the various pieces of aggregated content. Moreover, such interactions enabled by a mashup would be done on a server and thus would impact all users of the server.

SUMMARY OF ILLUSTRATIVE EMBODIMENTS

Disclosed are systems and methods for web browsing using placemarks and contextual relationships in a data processing system. A navigation placemark is provided within a web browser. The web browser comprises a first web page and a second web page. A piece of information is located at a specific location within each of the first web page and the second web page. In response to locating the piece of information, a first individual placemark is added to the navigation placemark within the first web page, and a second individual placemark is added to the navigation placemark within the second web page. In response to adding the first individual placemark and the second individual placemark, web page content is extracted from the first web page and can be used to control information shown within the second web page. An interaction between the first individual placemark within the first web page and the second individual placemark within the second web page is specified. A trigger criteria for each of the first individual placemark within the first web page and the second individual placemark within the second web page is also specified. A first profile is created, where the first profile comprises one or more from the group consisting of: a set of tabs; a set of browser windows; extractions rules; and an interaction model. A second profile is created, where the second profile comprises one or more from the group consisting of: a set of tabs; a set of browser windows; extractions rules; and an interaction model. In response to creating the first and second profiles, the first profile is run as a background process that can be driven by the second profile, and a user may switch between the first and second profiles. The web browser may further comprise a first browser window comprising the first web page and a second browser window comprising the second web page. The web browser may further comprise a browser window comprising a first tab and a second tab, where the first tab comprises the first web page and the second tab comprises the second web page.

The above, as well as additional objectives, features, and advantages of the present invention, will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments depict systems and methods for web browsing using placemarks and contextual relationships in a data processing system. A navigation placemark is provided within a web browser. The web browser comprises a first web page and a second web page. A piece of information is located at a specific location within each of the first and second web pages. A first individual placemark is added to the navigation placemark, and a second individual placemark is added to the navigation placemark. Web page content is extracted from the first web page and can be used to control information shown within the second web page. An interaction between the first individual placemark and the second individual placemark is specified. A trigger criteria for the first individual placemark and the second individual placemark is also specified. A first profile and a second profile are created. The first profile is run as a background process that can be driven by the second profile, and a user may switch between the first and second profiles. The web browser may further comprise a first browser window comprising the first web page and a second browser window comprising the second web page, and/or the web browser may further comprise a browser window comprising a first tab and a second tab, where the first tab comprises the first web page and the second tab comprises the second web page.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms "comprise", "comprises", and "comprising" are used in an open-ended fashion, and thus should be interpreted to mean "including, but not limited to . . . ". Also, the term "coupled" is intended to mean either an indirect or direct connection. Thus, if a first device is coupled to a second device, that connection may be through a direct connection, through an indirect connection via other devices and connections, or through a wireless connection. Moreover, the use of the terms first, second, etc. do not denote any order or importance, but rather the terms first, second, etc. are used to distinguish one element from another.

Figure 1:
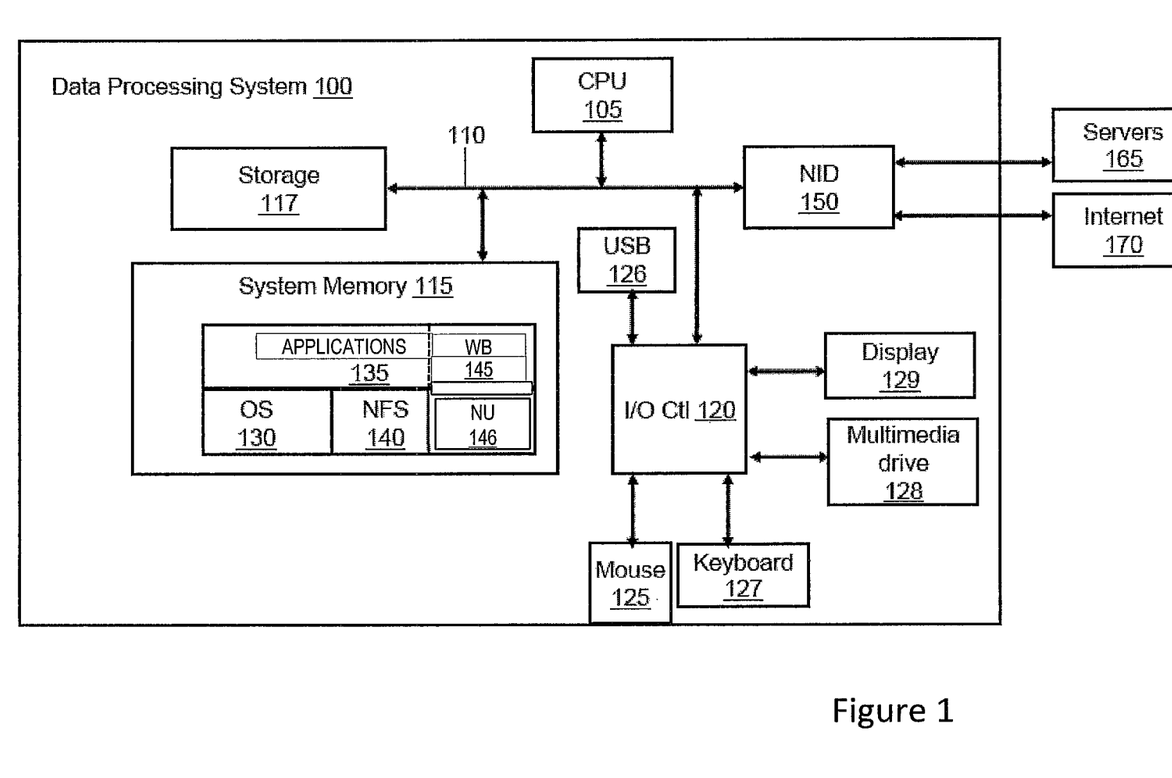
FIG. 1 is a block diagram of a data processing system configured with hardware and software components for implementing one or more embodiments of the present invention.

With reference now to the figures, FIG. 1 illustrates a block diagram representation of a data processing system (and connected network). Data processing system (DPS) 100 comprises at least one processor or central processing unit (CPU) 105 connected to system memory 115 via system interconnect/bus 110. System memory 115 is defined as a lowest level of volatile memory (not shown), including, but not limited to, cache memory, registers, and buffers. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) hub 126 are illustrated, coupled to I/O controller 120. Multimedia drive 128 and USB hub 126 may operate as both input and output (storage) mechanisms. DPS 100 also comprises storage 117, within which data/instructions/code may be stored.

DPS 100 is also illustrated with network interface device (NID) 150 coupled to system bus 110. NID 150 enables DPS 100 to connect to one or more access networks, such as servers 165 and Internet 170.

In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet 170, for example. Those of ordinary skill in the art will appreciate that the hardware depicted in FIG. 1 is a basic illustration of an ISP server, and thus the hardware utilized in actual implementation may vary. Thus, the depicted example is not meant to imply architectural limitations with respect to the present invention.

Notably, in addition to the above described hardware components of DPS 100, various features of the invention are completed via software (or firmware) code or logic stored within memory 115 or other storage (e.g., storage 117) and executed by CPU 105. In one embodiment, data/instructions/code from storage 117 populates the system memory 115, which is also coupled to system bus 110. Thus, illustrated within memory 115 are a number of software/firmware components, including operating system (OS) 130 (e.g., Microsoft Windows®, a registered trademark of Microsoft Corporation; GNU®, a registered trademark of the Free Software Foundation; Linux®, a registered trademark of Linus Torvalds; AIX®, a registered trademark of International Business Machines (IBM); or Mac OS®, a registered trademark of Apple Computer, Inc.), applications 135, network file system (NFS) 140, and web browser (WB) 145 (e.g., Internet Explorer®, a registered trademark of Microsoft Corporation; Netscape Navigator®, a registered trademark of Netscape Communications Corporation; Firefox®, a registered trademark of Mozilla Foundation; Opera®, a registered trademark of Opera Software ASA; or Safari®, a registered trademark of Apple Computer, Inc.) that comprises a navigation utility (NU) 146.

In actual implementation, applications 135, WB 145, and NU 146 may be combined as a single application collectively providing the various functions of each individual software component when the corresponding code is executed by the CPU 105. Additionally, components code of OS 130 may be combined with those of NU 146, collectively providing the various functional features of the present invention when the corresponding code is executed by the CPU 105. For simplicity, NU 146 is illustrated and described as a stand alone or separate software/firmware component, which is stored in system memory 115 to provide/support the specific novel functions described herein.

In one illustrative embodiment CPU 105 executes software code/instructions of NU 146. Among the software code/instructions provided by NU 146, and which are specific to the present invention, are: (a) code for providing navigation placemarks; (b) code for extracting and specifying web page content within a first web page that can be used to control information shown within a second web page; (c) code for specifying an interaction between web pages (i.e., an interaction model); (d) code for specifying a triggering criteria for each of the web pages; (e) code for creating a profile, the profile having a defined set of tabs and/or a defined set of browser windows, extractions patterns/rules, interaction model, and triggering criteria; (f) code for running a first profile as a background process that can be driven by a second profile; (g) code for switching between profiles; and (h) code for monitoring user actions and building a pattern of actions across tabs and/or across browser windows. For simplicity of the description, the collective body of code that enables these various features is referred to herein as NU 146. In some embodiments, NU 146 is implemented as a plug-in for web browser 145 that has an extensible architecture (e.g., Firefox®). In other embodiments, NU 146 is implemented as part of a stand-alone web browser. Moreover, a "web page", as used throughout the description and the claims, can be generally defined as any file, document, or markup language that can be retrieved from a web server (e.g., the servers 165 or the internet 170). The web page may be displayed via display 129. In addition, for purposes of this disclosure and the claims, a "first" web page and a "second" web page may belong to the same web site or to different web sites, where a "web site" comprises a plurality of individual web pages. Furthermore, throughout the description and the claims, a plurality of web pages (e.g., the first web page and the second web page) can be opened within a plurality of web browser windows or within a plurality of tabs within a single web browser window. According to one illustrative embodiment, when CPU 105 executes NU 146, DPS 100 initiates a series of functional processes that enable the above functional features as well as additional features/functionality, which are described below within the description of FIGS. 2-3.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
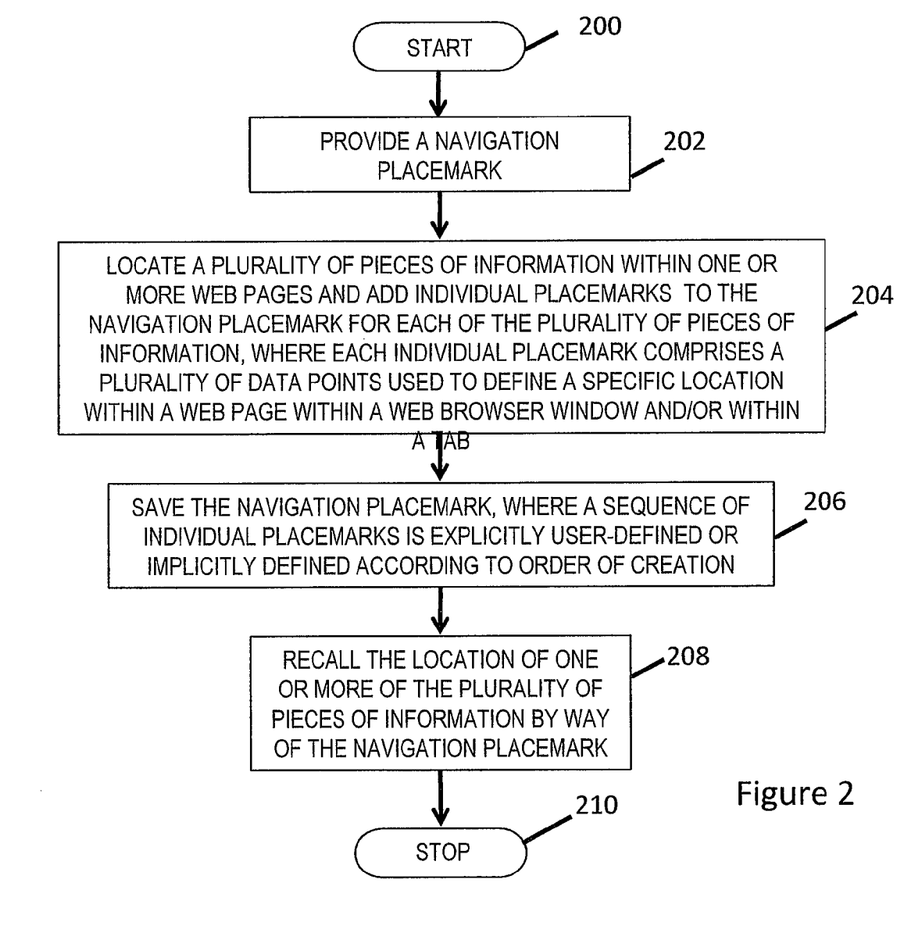
FIG. 2 is a high-level logical flowchart illustrating an exemplary method for web page navigation using placemarks in accordance with one or more embodiments of the present invention.
Figure 3:
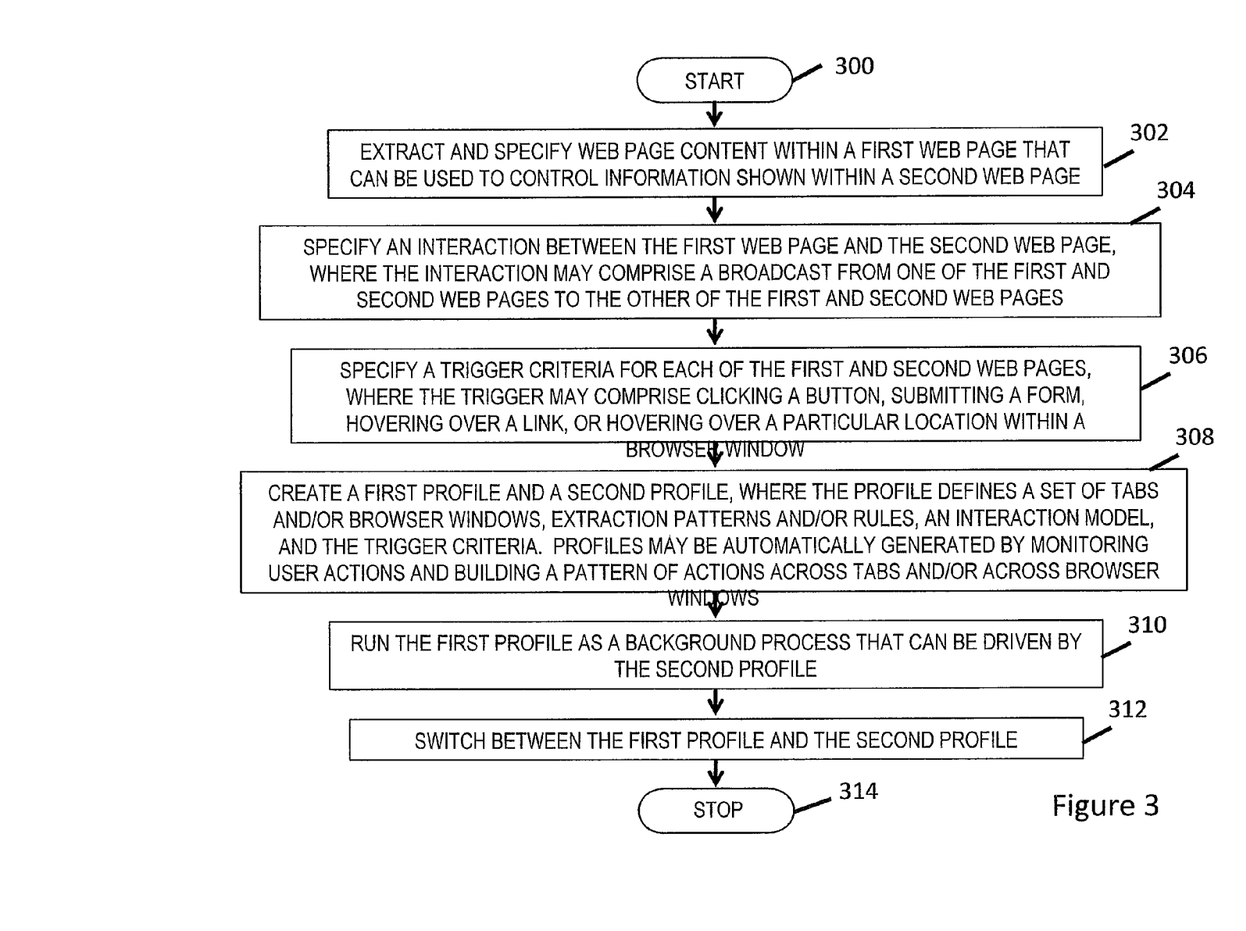
FIG. 3 is a high-level logical flowchart illustrating an exemplary method for web page navigation using contextual relationships in accordance with one or more embodiments of the present invention.

FIGS. 2 and 3 are high-level logical flow charts illustrating exemplary methods for web browsing using placemarks and contextual relationships. Although the methods illustrated in FIGS. 2 and 3 may be described with reference to components shown in FIG. 1, it should be understood that this is merely for convenience and alternative components and/or configurations thereof can be employed when implementing the various methods. Key portions of the methods may be completed by NU 146 executing within DPS 100 (FIG. 1) and controlling specific operations of/on DPS 100, and the methods are thus described from the perspective of either/both NU 146 and DPS 100.

The process of FIG. 2 illustrates an exemplary method used to enable web browsing with navigational placemarks, which comprise a plurality of individual placemarks. The process begins at block 200 and goes to block 202, where a navigation placemark is provided (i.e., initiated). In some embodiments, the function of providing the navigation placemark, as well as the individual placemarks, is implemented as a browser plug-in. A new navigation placemark can be initiated at any time and individual placemarks can be added to the navigation placemark at any time while a user is browsing the Internet. In some embodiments, NU 146 provides a user-interface that allows the user to define and place navigation placemarks and individual placemarks. In block 204, a plurality of pieces of information are located as being within one or more web pages (e.g., within one or more of a plurality of tabs of a single browser window and/or within one or more of a plurality of web browser windows) and individual placemarks are added to the navigation placemark for each of the plurality of pieces of information. For example, when a user searching for information (e.g., on the Internet) happens upon a first piece of desired information within a web page, the user can leave an individual placemark, which denotes an exact location within the web page where the first piece of information was found. When a new individual placemark is defined, NU 146 can detect the document object model (DOM) structure of the web page in order to properly place the individual placemark. In particular, when the individual placemark is defined, a plurality of data points associated with the individual placemark can be used to define the actual position of the placemark within the web page. As the user continues searching (e.g., within the same web page or within a different web page) and finds a second piece of information, the user can leave another individual placemark denoting the exact location within the web page where the second piece of information was found. During the entire course of a search, the user may leave numerous placemarks, each of which indicates an exact location within a web page containing a piece of information relevant to the user's search. For purposes of this disclosure, the plurality of placemarks left during the course of a search may be referred to as a "chain of placemarks" or a "placemark chain". The process proceeds to block 206, where the placemark chain is saved as a navigation placemark, and where a sequence of individual placemarks is defined. The navigation placemark stores the sequence of individual placemarks defined in the placemark chain. In some embodiments, the user explicitly defines the sequence of individual placemarks. In other embodiments, the sequence of individual placemarks is implicitly defined according to the order of creation of the individual placemarks. In addition to a list of individual placemarks, the navigation placemark saves metadata (e.g., data points that define the position of the individual placemark within the web page) associated with each of the individual placemarks. Once saved, the navigation placemark can be exported and/or shared among other users. Thereafter, as shown in block 208, the user may recall the location of one or more of the plurality of pieces of information by way of the navigation placemark. For example, the navigation placemark may be played as a macro, where the web browser 145 navigates from web page to web page (and/or web site to web site), going to specific locations within each of the web pages (e.g., within one or more of a plurality of tabs of a single browser window and/or within one or more of a plurality of web browser windows) as defined by the individual placemarks. The process then ends at block 210.

A tabbed web browser window, having a plurality of tabs, can be used to open a plurality of web sites and/or web pages, where one of the plurality of web sites and/or web pages is open within each one of the plurality of tabs of the tabbed browser window. Moreover, one or more of the web sites and/or web pages within one or more of the plurality of tabs may contain one or more individual placemarks that belong to a particular navigation placemark. However, the placemarks and tabs alone do not allow for contextual based browsing. That is, there is currently no model where data can flow between two distinct web sites and/or web pages (e.g., where each web site and/or web page is within a distinct tab or within a distinct browser window). Any contextual grouping of the information contained within the tabs and/or browser windows would have to be performed manually by the user, making content management a tedious process.

The process of FIG. 3 illustrates an exemplary method used to enable web browsing using contextual relationships according to various embodiments of the present invention. In particular, users may build relationships between content (e.g., between placemarks) within multiple web pages (e.g., within multiple tabs of a single web browser window and/or within multiple web browser windows) and create a profile. For example, in some embodiments, a tab profile may comprise a group of tabs. In other embodiments, a profile may comprise a group of web browser windows. In some embodiments, each of the tabs of the group of tabs (or each of the web browser windows of the group of web browser windows) may correspond to a distinct web site and/or web page, and the group of tabs and/or the group of web browser windows (i.e., the context) can be entirely defined and controlled by the user. In some embodiments, such web browsing using contextual relationships is implemented by way of a browser plug-in. In other embodiments, the same functionality may be implemented using client side Javascript® (a registered trademark of Sun Microsystems, Inc.) inserts. Returning to FIG. 3, the process begins at block 300 and continues to block 302, where web page content within a first web page (where the first web page may be within a first tab or within a first web browser window) is extracted and specified to control information shown within a second web page (where the second web page may be within a second tab or within a second web browser window). In some embodiments, this function can be performed by highlighting desired information (e.g., within an individual placemark), and the underlying implementation (i.e., NU 146) can perform a semantic/lexical analysis of the DOM and identify unique characteristics that can be used to extract this highlighted information. Once identified, the same information can be repeatedly extracted when different content from the same web site and/or web page is displayed within the tab (or within the browser window). In other embodiments, users may specify regular expressions (e.g., by way of a user interface provided by the browser plug-in) to further narrow down the extracted information. In yet other embodiments, the information extraction can happen from a uniform resource locator (URL) or from content of the web page within the tab (or within the browser window). In some embodiments, the user may provide custom Javascript® for information extraction. The process then proceeds to block 304, where the user specifies an interaction between the first web page and the second web page (where each of the first and second web pages may be within one of a first tab and a second tab or within a first browser window and a second browser window). In some embodiments, the interaction may take the form of a broadcast to all "listening" tabs and/or browser windows. In addition, an event broker is provided within the browser where tabs and/or browser windows (each comprising individual placemarks) can publish to and listen to topics of interest. The publishing to and listening to topics by the individual placemarks is user defined and saved within the DPS 100. In block 306, a trigger criteria is specified for each of the first and second web pages. The trigger may comprise the click of a button, the submission of a form, hovering over a link, hovering over specific web page content, or another predefined action. As an example of the interaction between web pages (and thus between tabs and/or browser windows), a placemark within a second tab (or web browser window) listening for a numeric value from a placemark in a first tab (or web browser window) will receive the numeric value automatically upon activation of the proper trigger (e.g., within the first tab or web browser window). In this manner, data can flow between placemarks (and thus between tabs and/or browser windows). In some embodiments, the data flowing between placemarks may be transformed, for example, by way of some custom user-defined Javascript®. Thereafter, in block 308, a profile (e.g., a tab profile) is created. The profile comprises a set of user defined web pages, which may further comprise user defined tabs (where tabs are named with labels that are unique for a particular tab profile) and/or user defined browser windows, extraction patterns and/or rules, an interaction model (e.g. a tab interaction model and/or browser window interaction model as defined in block 304), and triggering criteria (e.g., as defined in block 306). In some embodiments, profiles may be automatically generated by monitoring user actions and building a pattern of actions across web pages, which further comprises building a patter of actions across tabs and/or across browser windows. In addition, the profile can named, categorized, shared with other users, and collaboratively modified and/or updated. In block 310, a first profile (e.g., a first tab profile) is active (i.e., run) as a background process and can be driven by a second profile (e.g. a second tab profile). As shown in block 312, the user can then switch between the first and second profiles. The process then ends at block 314.

The monitoring of user actions, as illustrated in block 308, may comprise a two stage process. For example, the first stage may comprise pattern learning from user interaction across distinct web sites and/or web pages, and the second stage may comprise semantic intelligence for data extraction and automatic profile generation.

It should be understood that one or more aspects of the present invention may alternatively be implemented in a computer usable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore not to be taken in a limiting sense, and the scope of the present invention is defined only by the appended claims.

As will be further appreciated, the processes in embodiments of the present invention may be implemented using software, firmware, hardware, or any combination thereof or their equivalent. As a preparatory step to practicing the invention in software, the programming code (whether software or firmware) may be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. In some embodiments, transmission type media may include computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A computer-implemented method, comprising:
    adding, to a navigation placemark, a first individual placemark associated with a first particular location within the first web page;
    adding, to the navigation placemark, a second individual placemark associated with a second particular location within a web page;
    defining, within the navigation placemark, a sequential order by which the first and second particular locations are to be displayed;
    receiving, from a user, a selection of the navigation placemark; and
    displaying the first web page and the web page based upon:
        the selection of the navigation book mark, and
        the defined sequential order, wherein
    the display of the first web page is focused on the first particular location,
    the display of the second web page is focused on the second particular location, and
    at least a portion of the first content controls at least a portion of the second content being displayed.

2. The method of claim 1, wherein
the sequential order is user-defined.

3. The method of claim 1, wherein
the sequential order is based upon an order of creation of the individual placemarks.

4. The method of claim 1, wherein
the first web page is displayed in a first tab of a browser and the web page is displayed in a second page of the browser.

5. The method of claim 1, wherein
the first web page is displayed within a first browser window and
the second web page is displayed within a second browser window.

6. The method of claim 1, wherein
the web page is the first web page.

7. The method of claim 1, wherein
a trigger criteria is associated with an interaction with the first web page associated with the first individual placemark, and
the display of the second web page is automatically updated based upon the trigger criteria being met.

8. A computer hardware system, comprising:
    at least one hardware processor unit, wherein the at least one hardware processor is configured to perform:
        adding, to a navigation placemark, a first individual placemark associated with a first particular location within the first web page;
        adding, to the navigation placemark, a second individual placemark associated with a second particular location within a web page;
        defining, within the navigation placemark, a sequential order by which the first and second particular locations are to be displayed;
        receiving, from a user, a selection of the navigation placemark; and
        displaying the first web page and the web page based upon:
            the selection of the navigation book mark, and
            the defined sequential order, wherein
        the display of the first web page is focused on the first particular location,
        the display of the second web page is focused on the second particular location, and
        at least a portion of the first content controls at least a portion of the second content being displayed.

9. The system of claim 8, wherein
the sequential order is user-defined.

10. The system of claim 8, wherein
the sequential order is based upon an order of creation of the individual placemarks.

11. The system of claim 8, wherein
the first web page is displayed in a first tab of a browser and the web page is displayed in a second page of the browser.

12. The system of claim 8, wherein
the first web page is displayed within a first browser window and
the second web page is displayed within a second browser window.

13. The system of claim 8, wherein
the web page is the first web page.

14. The system of claim 8, wherein
a trigger criteria is associated with an interaction with the first web page associated with the first individual placemark, and
the display of the second web page is automatically updated based upon the trigger criteria being met.

15. A computer program product, comprising
a computer usable storage device having stored therein computer usable program code,
the computer usable program code, which when executed by a computer hardware system, causes the computer hardware system to perform:
    adding, to a navigation placemark, a first individual placemark associated with a first particular location within the first web page;
    adding, to the navigation placemark, a second individual placemark associated with a second particular location within a web page;

defining, within the navigation placemark, a sequential order by which the first and second particular locations are to be displayed;
receiving, from a user, a selection of the navigation placemark; and
displaying the first web page and the web page based upon:
the selection of the navigation book mark, and
the defined sequential order, wherein the display of the first web page is focused on the first particular location, the display of the second web page is focused on the second particular location, at least a portion of the first content controls at least a portion of the second content being displayed, and the computer usable storage device does not consist of a transitory, propagating signal.

16. The computer program product of claim 15, wherein the sequential order is user-defined.

17. The computer program product of claim 15, wherein the sequential order is based upon an order of creation of the individual placemarks.

18. The computer program product of claim 15, wherein the first web page is displayed in a first tab of a browser and the web page is displayed in a second page of the browser.

19. The computer program product of claim 15, wherein the first web page is displayed within a first browser window and
the second web page is displayed within a second browser window.

20. The computer program product of claim 15, wherein the web page is the first web page.

* * * * *